Figure 1:
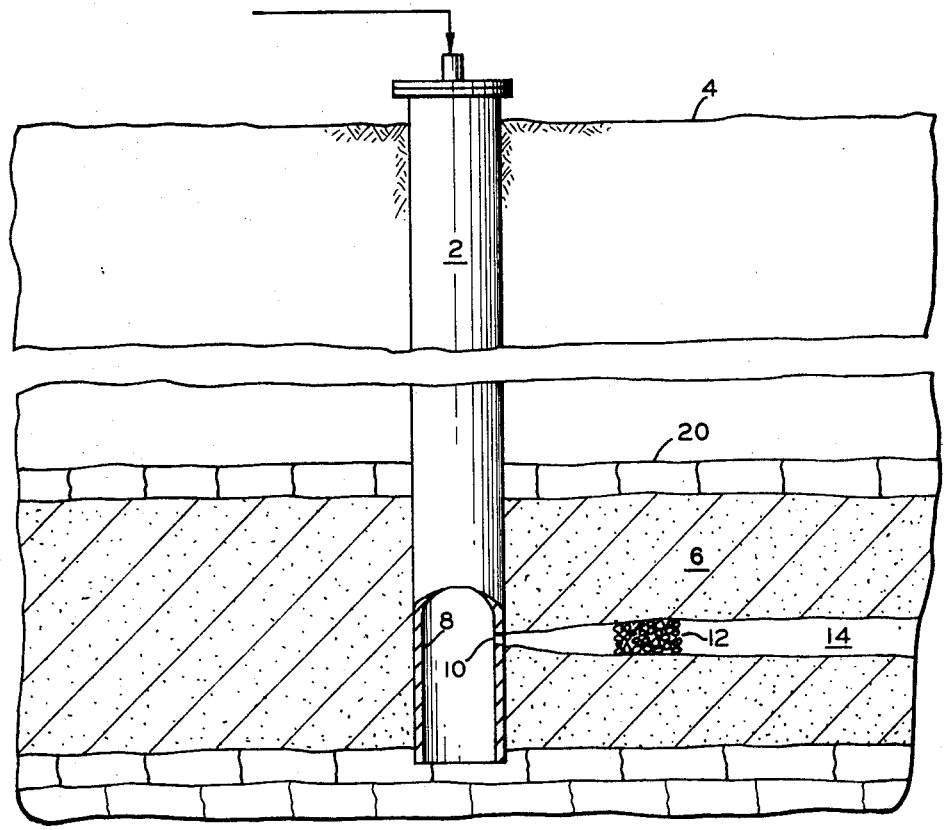

United States Patent

[11] 3,608,639

[72] Inventor Frank L. Hart
 Bartlesville, Okla.
[21] Appl. No. 3,900
[22] Filed Jan. 19, 1970
[45] Patented Sept. 28, 1971
[73] Assignee Phillips Petroleum Company

[54] METHOD OF FRACTURING WITH POPCORN POLYMER
 8 Claims, 2 Drawing Figs.

[52] U.S. Cl. .................................................. 166/308, 166/295
[51] Int. Cl. ............................................... E21b 43/26
[50] Field of Search ........................................ 166/283, 294, 295, 308; 260/92.8 W

[56] References Cited
UNITED STATES PATENTS

| | | | |
|---|---|---|---|
| 2,274,297 | 2/1942 | Irons et al. | 166/295 X |
| 2,661,066 | 12/1953 | Bond | 166/308 UX |
| 2,761,511 | 9/1956 | Billue | 166/295 X |
| 2,827,121 | 3/1958 | Nowak | 166/295 X |
| 2,843,576 | 7/1958 | Dunn et al. | 260/92.8 W |
| 3,251,414 | 5/1966 | Willman | 166/294 X |
| 3,379,253 | 4/1968 | Chism | 166/295 |
| 3,412,796 | 11/1968 | Dekking | 166/295 |

OTHER REFERENCES

Bovey, F. A., et al. Emulsion Polymerization N.Y., Interscience, 1955. pp. 34, 35, 236. (Copy in group 140)

Schildknecht, Calvin E. High Polymers, Vol. X. N.Y., Interscience, 1956. pp. 65–67. (Copy in Group 140)

Primary Examiner—Ian A. Calvert
Attorney—Young and Quigg

ABSTRACT: A method for exerting forces on a subterranean formation for fracturing and increasing the width of a fracture wherein polymerizable materials capable of forming popcorn polymer are placed in the formation and polymerized in situ.

PATENTED SEP 28 1971 3,608,639

INVENTOR.
F. L. HART
BY Young & Quigg
ATTORNEYS 3,608,639

METHOD OF FRACTURING WITH POPCORN POLYMER

This invention resides in a new method of exerting forces on a subterranean formation. In another aspect this invention resides in a new method for exerting forces on adjacent portions of a subterranean formation defined by a fracture extending therethrough for increasing the width of the fracture.

The heretofore generally utilized method for exerting forces on a subterranean formation, fracturing said formation, increasing the width of the fracture, and propping said fracture in an open position was by pumping a fluid into the formation at a sufficiently high rate to cause the formation to fracture and mixing a propping agent such as sand with the fracturing fluid to maintain the fracture in an open position. Owing to the difficulties encountered in passing propping agents through a pump, the largest propping particle size that can easily be pumped with the fracturing fluid is about 8 mesh. For this reason, hydraulic fracturing methods presently utilized, particularly in the oil industry, form fractures that have a thickness considerably less than one-eighth inch. It is therefore an object of this invention to provide a method for exerting forces on a subterranean formation. Another object of this invention is to provide a method for fracturing a subterranean formation. Yet another object of this invention is to provide a method for creating high volume fractures through a subterranean formation. A further object of this invention is to provide a method for increasing the width of a fracture. A still further object of this invention is to maintain a high volume fracture in an open position. Other aspects, objects, and advantages of the present invention will become apparent from a study of the disclosure, the appended claims, and the drawing.

Figure 2:
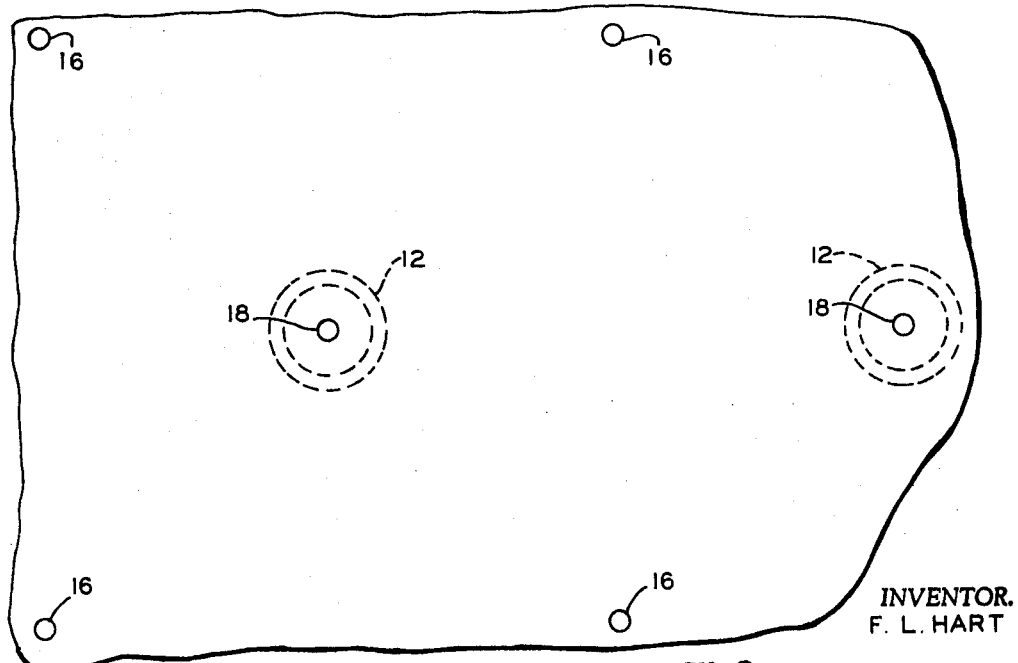

The drawings are diagrammatic views of an oil field. FIG. 1 is a partial sectional view showing a well penetrating a hydrocarbon-producing formation of a portion of the oil field and FIG. 2 is a plan view showing the limits of the oil field and wells that penetrate the producing formation.

Referring to FIG. 1, a well 2 is drilled from the surface of the earth 4 downwardly through various formations and penetrates a hydrocarbon-containing formation 6. The well 2 is completed, for example, by setting casing 8 from the surface 4 through the hydrocarbon-containing formation 6, cementing said casing, and perforating the casing 8 to form an opening 10 for fluid communication between the formation 6 and the surface 4. A polymerizable material that is capable of forming popcorn polymer 12 (to be later more fully described) is thereafter placed in the formation 6 by, for example, pumping said material from the surface 4 downwardly through the casing 8, the opening 10 of the casing, and into the formation 6. The polymerizable material is thereafter maintained under polymerizable conditions within the formation for a time sufficient to polymerize at least a portion of said material and form popcorn polymer 12 in situ. As the popcorn polymer 12 forms within the formation 6, the volume of the injected material increases and exerts forces upon the formation 6. These forces increase in magnitude to a value at which the formation 6 is fractured. By continuing to maintain the injected material under polymerization conditions after initial formation fracturing, the mass of popcorn polymer 12 will continue to enlarge thereby increasing the thickness of the fracture. Thereafter the fracture 14 is maintained in an open position by the popcorn polymer 12 within the fracture 14.

In order to protect the well 2 against possible damage during fracturing of the formation, the polymerizable material can be spaced a distance from the well 2 by passing the material outwardly from the well 2. Separation of the polymerizable material from the well 2 can be accomplished by pumping a volume of fluid behind the polymerizable material thereby forcing said material a desired distance through the formation 6. Further protection of the well can be offered by creating the fracture of this invention prior to setting casing 8 within the well 2. After the high-capacity fracture of this invention is formed, the well 4 can be cleaned out and the casing thereafter installed, cemented, and perforated as desired.

Another method of exerting pressure on a subterranean formation and creating a high-capacity fracture is by placing the polymerizable material in a fracture that extends outwardly through the formation from the well bore and maintaining said material under polymerization conditions until a popcorn polymer mass has formed in situ within the fracture and exerted a force sufficient to increase the width of said fracture.

It has also been found that the period of time required for the formation of a sufficient mass of popcorn polymer 12 to create high-capacity fractures 14 through the formation 6 is reduced by mixing particles of popcorn polymer with the polymerizable material used in this invention. These popcorn polymer particles should be insoluble in the polymerizable material, characterized by swelling upon exposure to the polymerizable material, and comprise a relatively large number of methylene groups.

A substantially continuous high-capacity fracture can be formed through a hydrocarbon-producing formation 6 over a wide areal extent by placing a plurality high-capacity of the polymerizable material in the formation 6 with at least a high-capacity said volumes being at spaced-apart locations. Referring to FIG. 2, a plurality of producing wells 16 penetrate the subterranean formation 6 which covers a large hydrocarbon-producing area hereafter referred to as a field. Various wells in the field are selected for the injection of the polymerizable material. The growth of popcorn polymers within the formation 6 thereafter creates a high-capacity fracture of large areal extent. The selection of injection wells 18 for the placement of polymerizable material is dependent upon several factors such as, for example, the depth of the formation 6, the thickness and characteristics of the caprock 20, the thickness and characteristics of the formation 6, the configuration of the field, etc. Core analysis of the various formations penetrated by the wells will supply valuable data for the placement of the polymerizable material.

In some areas it may be necessary to develop large areas of popcorn polymer 12 within the formation in order to create the desirable high-capacity fractures and maintain said fractures in an open position. The term "high-capacity fracture" herein means any fracture having a vertical separation between walls of the fracture larger than about one-sixteenth inch. By continuing to maintain polymerizable materials within the fracture and conditions therein which promote the formation of popcorn polymers 12, a fracture having a vertical separation in excess of one-sixteenth inch can be created, as for example 1 inch and larger.

Popcorn polymer is sometimes referred to as cauliflower, sponge, and Kondakos. Popcorn polymer is a hard, porous opaque material that is not soluble in ordinary solvents. The occurrence of popcorn polymer is well known in chemical plants such as for example a synthetic rubber plant and as described in Industrial and Engineering Chemistry, July, 1947, page 830, "Inhibition of Polymerization, Laboratory and Plant Control of Popcorn Polymer Growth" by M. S. Kharasch et al. Popcorn polymer forms in equipment of these plants and sometimes results in destruction of the equipment. The forces that are exerted by the forming popcorn polymer have been known to split extra heavy steel pipe, snap pluralities of bolts and force bubble trays upwardly through towers and, in general, exhibit forces greatly in excess of that needed to fracture and separate subterranean formations. The popcorn polymer also exhibits a characteristic of being capable of continued growth against opposing forces. This fact is evidenced by examining steel-lined pipe that has been ruptured by the forces of popcorn polymer growth over a relatively small length of the pipe. This characteristic therefore enables a formation fracture to be expanded by popcorn polymer growth without plugging the fracture over its length.

Although the formation of popcorn polymer particles or seeds if a relatively slow process, it has been discovered that polymer growth from an existing seed is a very rapid reaction. Therefore it is preferred that popcorn polymer particles or seeds be placed within the formation in order to more rapidly create desirable high-capacity fractures. Regardless of the method of initiating polymer growth within the formation, by forming seeds therein or by initially placing seeds within the formation in contact with monomers, the most remarkable characteristic is the phenomenon of growth which a seed exhibits when in contact with liquid or gaseous monomers. It has also been discovered that when butadiene, styrene, or a mixture of the two, for example, is brought into contact with a popcorn polymer seed, the bulk of the monomer is rapidly converted into a popcorn polymer that is similar in properties to the original seed. Since most all American synthetic-rubber-manufacturing plants, for example, have active popcorn polymer seeds in the operating equipment, it is therefore more convenient and less time consuming to practice the method of this invention by utilizing popcorn polymer seeds as opposed to first producing seeds within the formation and thereafter promoting popcorn polymer growth to produce the desired forces on the formation.

Popcorn polymer growth is somewhat proportional to the peroxide content. For this reason whenever the polymer growth is continued without the addition of new peroxide groups, subsequent growth is less active than preceding growth. It then sometimes becomes necessary to supply additional peroxide groups such as, for example, hydroperoxides, to the polymerizable material within the formation. This is especially true when fractures having very wide vertical separation are desired. These groups are most readily formed when oxygen attacks methylene groups adjacent aliphatic double bonds. Consequently the more methylene groups present in the polymerizable material within the formation, the greater will be the rate and resultant growth of the popcorn polymer therein. Examples of materials containing such methylene groups are polybutadiene, copolymers containing considerable butadiene, and others known in the art. Popcorn polymer seeds are known to grow rapidly in not only styrene, butadiene, or mixtures thereof but also in other unsaturated monomers such as, for example, isoprene, methylmethacrylate.

Polymerizable materials that are found to form popcorn polymer can therefore be placed in a subterranean formation and there maintained under polymerization conditions to form popcorn polymers in situ and exert pressure on the formation with said polymer. Since pressure and temperature conditions of various hydrocarbon-containing formations vary widely relative to one another and the growth rate of popcorn polymers varies among the polymerizable material types capable of forming the popcorn polymer and the volumes of material utilized, the particular treatment employed depends upon the magnitude of the desired results, the types and volumes of material and the formation conditions where utilized. However, an example treatment to cause fracture widening is as follows:

EXAMPLE I

| | |
|---|---|
| Formation Depth | 2,300 feet |
| Formation Temperature | 170° F. |
| Formation Pressure | 2,000 p.s.i. |
| Formation Type | Sandy lime |
| Fractures | Previously fractured with 30,000 gals. crude oil with 2 lbs. 10–20 sand per gal. |
| Gas Cap | None |
| Water | None |
| Initial Production | 2,000 barrels |
| Oil Gravity | 35° API |
| Polymerizable Material | Butadiene + butadiene popcorn polymer seeds |
| Volume | 1,000 Gallons + 20 pounds powdered seeds |
| Distance Spaced from Well Bore | 20 feet |
| Flush Medium Utilized | Crude oil |
| Time Well Closed In | 2 days |

These high-capacity fractures are particularly advantageous for use in moving fluids through the formation to locations spaced from the well bore. Examples of uses that can be made of the high-capacity fractures of this invention are: acidizing the hydrocarbon-containing formation, heating the hydrocarbon-containing formation, filling the fracture with a blocking material to prevent the flow of water upwardly through the formation or gas downwardly through the formation, in situ refining and upgrading of petroleum fluids, separation of water zones from hydrocarbon-containing zones of the formation, and by other well treatments that utilize a conventional fracture.

Other modifications and alterations of this invention will become apparent to those skilled in the art from the foregoing discussion and accompanying drawing, and it should be understood that this invention is not to be unduly limited thereto.

What is claimed is:

1. A method for exerting forces for fracturing a formation and for increasing the width of a fracture through a formation, comprising:
   placing in the formation a polymerizable material capable of forming hard, porous, relatively insoluble popcorn polymer; and
   maintaining said material under polymerization conditions within the formation for a time sufficient to polymerize at least a portion of the material, form popcorn polymer in situ, and move one portion of the formation a spaced distance from an adjacent portion of the formation by the forming of said popcorn polymer in situ.

2. A method, as set forth in claim 1, wherein the polymerizable material comprises butadiene.

3. A method, as set forth in claim 1, wherein the polymerizable material comprises a butadiene and styrene mixture.

4. A method, as set forth in claim 1, wherein the polymerizable material is placed in the formation by passing said material downwardly through a well and outwardly through the formation.

5. A method, as set forth in claim 1, wherein the polymerizable material is passed downwardly through a well and outwardly though the formation to a location spaced from the well bore.

6. A method, as set forth in claim 1, wherein a plurality of volumes of the polymerizable material are placed in the formation with at least a portion of said volumes being at spaced-apart locations.

7. A method, as set forth in claim 1, wherein the subterranean formation is penetrated by a well bore having a fracture extending outwardly through the formation from the well bore, the polymerizable material is placed in the formation by passing said material through the well bore and into the fracture, and said material is maintained under polymerization conditions until a popcorn polymer has formed in situ and exerted a force sufficient to increase the width of said fracture.

8. A method, as set forth in claim 1, wherein the polymerizable material has popcorn polymer particles mixed therewith, said particles being insoluble in the polymerizable material, characterized by swelling upon exposure to the polymerizable material and comprising a relatively large number of methylene groups.